(12) United States Patent
Kuo

(10) Patent No.: US 7,437,816 B1
(45) Date of Patent: Oct. 21, 2008

(54) LATHE WITH ARRANGEMENT FOR DROPPING CHIPS INTO A CONTAINER WITHOUT BLOCKING MOVING PATH OF A SADDLE

(76) Inventor: Ching-hui Kuo, 149-1, Jusen Village, Tornluo, Miaoli (TW)

( * ) Notice: Subject to any disclaimer, the term of this patent is extended or adjusted under 35 U.S.C. 154(b) by 0 days.

(21) Appl. No.: 11/956,586

(22) Filed: Dec. 14, 2007

(51) Int. Cl.
*B23Q 37/00* (2006.01)

(52) U.S. Cl. .................. 29/563; 29/27 C; 409/137; 82/52

(58) Field of Classification Search ........... 29/27 C, 29/33 P, 563, 564; 82/52, 132, 157, 901; 409/137, 163, 164, 165, 172, 178, 235; 414/242, 414/246
See application file for complete search history.

(56) References Cited

U.S. PATENT DOCUMENTS 6,745,455 B2 * 6/2004 Popp et al. ............. 29/563

* cited by examiner

*Primary Examiner*—Dana Ross

(57) ABSTRACT

A lathe includes a base on a bed having a forward container, a cutting tool on a front surface of the base, an arm on an upper portion of the base, a saddle on an underside of the arm, a first motor at an open end of the arm for moving the saddle, a container at a forward end of the bed, a slide on an underside of the saddle, a second motor on a front surface of the cutting tool for moving the slide, and a chuck assembly on an underside of the slide and including a housing, a third motor at a front end of the housing and having a driving shaft projecting out of a rearward end of the housing, and a chuck at an end of the driving shaft. A workpiece held by the chuck is always disposed above the container during a machining operation.

3 Claims, 4 Drawing Sheets

LATHE WITH ARRANGEMENT FOR DROPPING CHIPS INTO A CONTAINER WITHOUT BLOCKING MOVING PATH OF A SADDLE

BACKGROUND OF THE INVENTION

1. Field of Invention

The invention relates to chip removal devices for lathes and more particularly to a lathe having an arrangement for directly dropping chips into a container therebelow such that the formed chips will not block moving path of a saddle in a machining operation of the lathe.

2. Description of Related Art

A lathe is a machine for shaping an article of wood, metal, or the like by holding and turning it rapidly against the edge of a cutting tool. Chips formed during a machining operation will fall into a concave channel of a saddle. These accumulated chips can block the moving path of the saddle. Hence, a regular removal of the chips by a worker is required. However, this is a time consuming and labor-intensive process. Moreover, it is dangerous since the worker has to stretch out the hand into the channel by passing the sharp cutting tool during the chip removal process. Thus, the need for improvement exists.

There have been numerous suggestions in prior patents for removing chips from a lathe. For example, U.S. Pat. No. 6,539,827 discloses an apparatus and method for discharging chips from a lathe.

SUMMARY OF THE INVENTION

It is therefore one object of the invention to provide a lathe having an arrangement for dropping chips into a container therebelow such that the formed chips will not block moving path of a saddle in a machining operation of the lathe.

It is defined that the term "chips" includes chips, shavings, and other metal particles which are removed during a metal cutting operation of a lathe.

The above and other objects, features and advantages of the invention will become apparent from the following detailed description taken with the accompanying drawings.

DETAILED DESCRIPTION OF THE INVENTION

Figure 1:
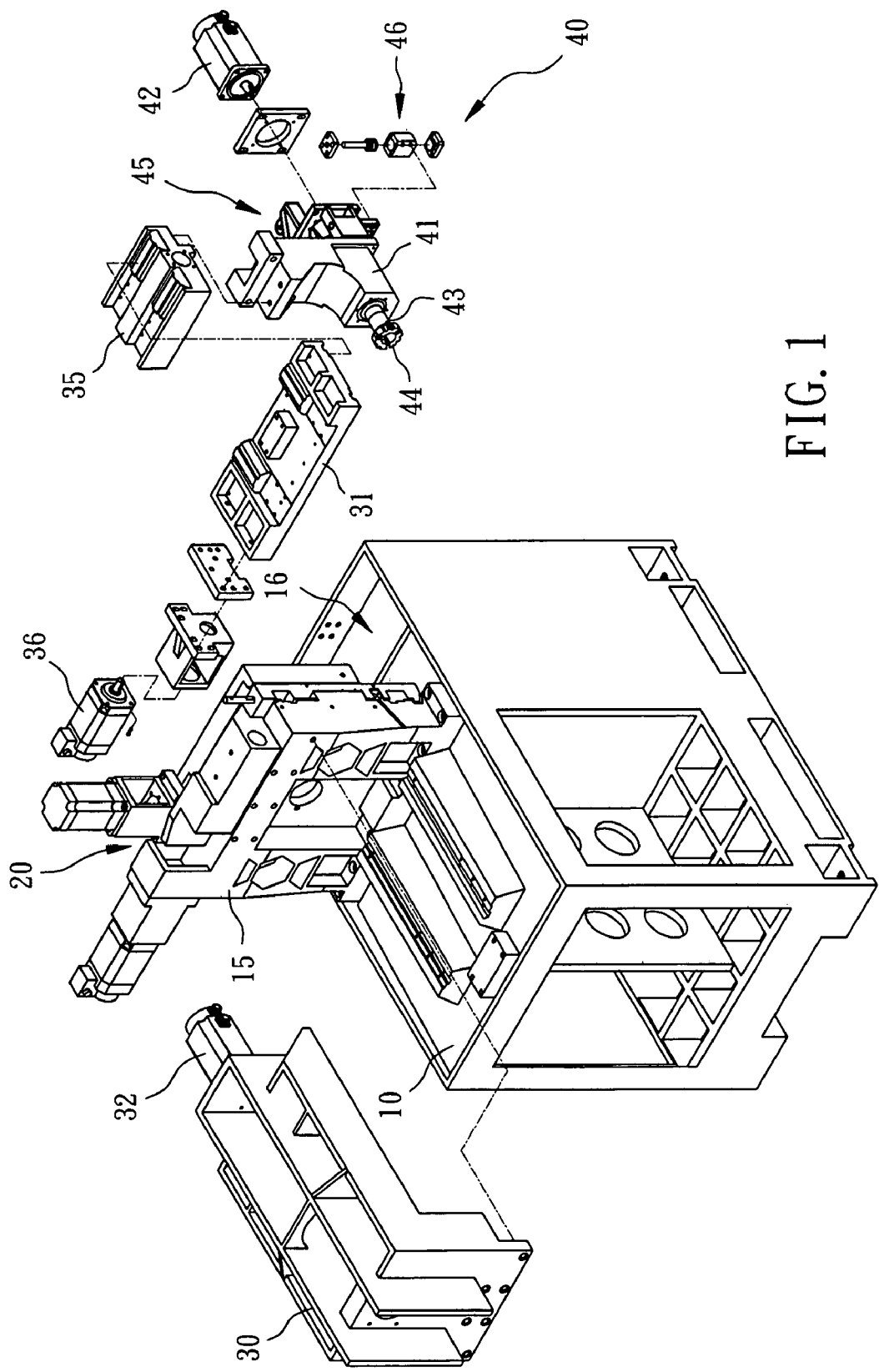
FIG. 1 is an exploded view of a preferred embodiment of lathe according to the invention.
Figure 2:
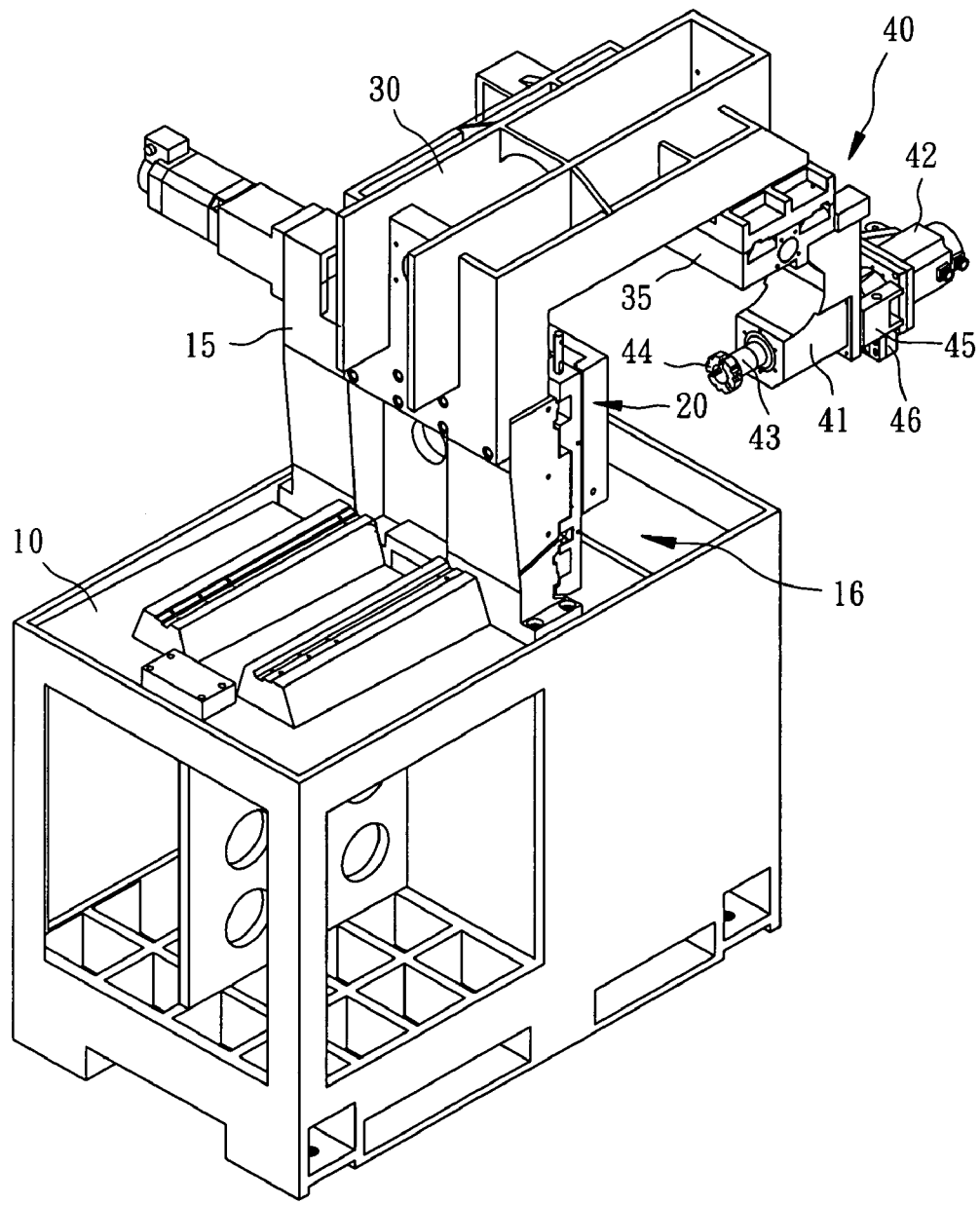
FIG. 2 is a perspective view of the assembled lathe according to the invention.
Figure 3:
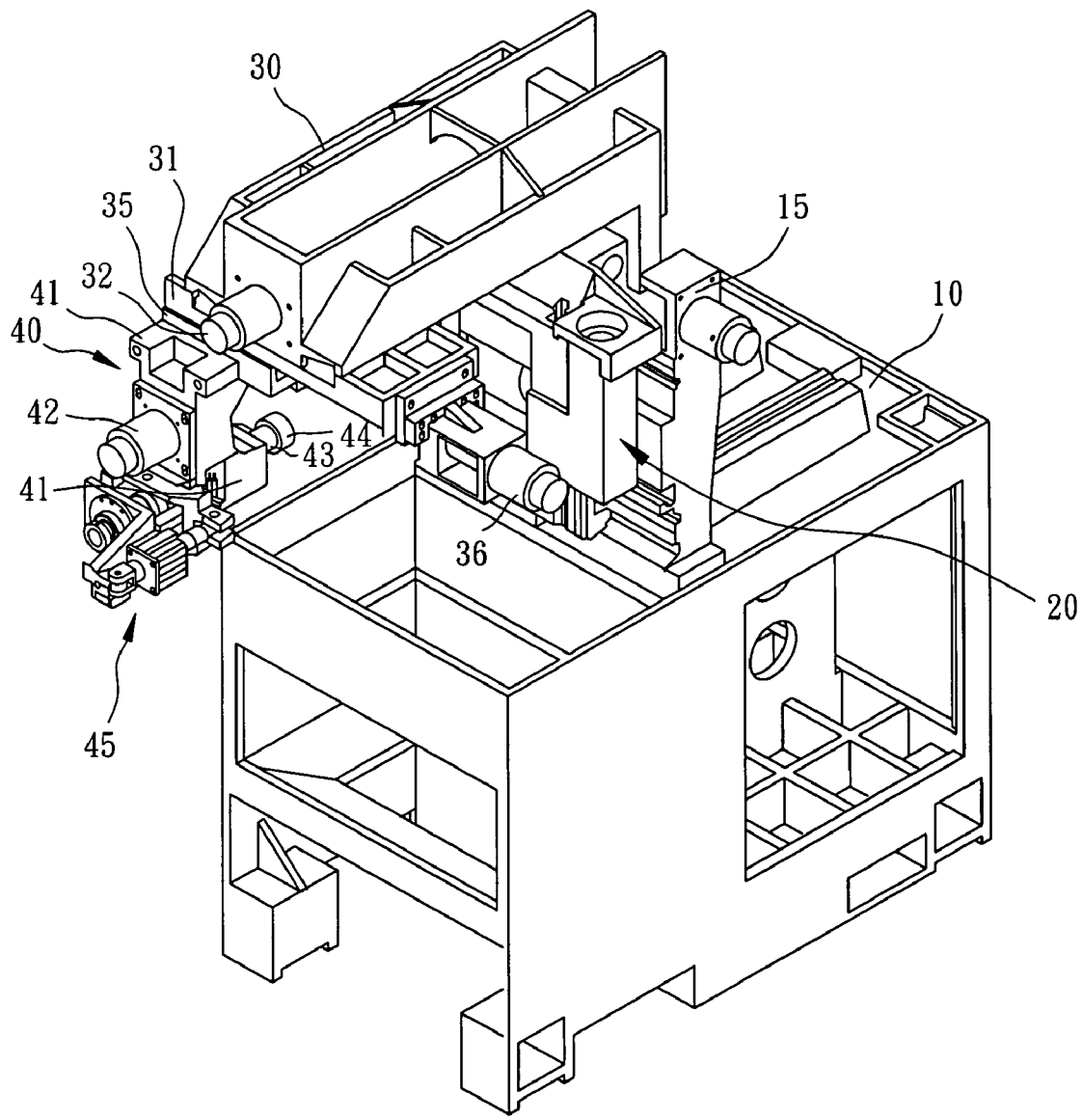
FIG. 3 is another perspective view of the assembled lathe according to the invention from the front.
Figure 4:
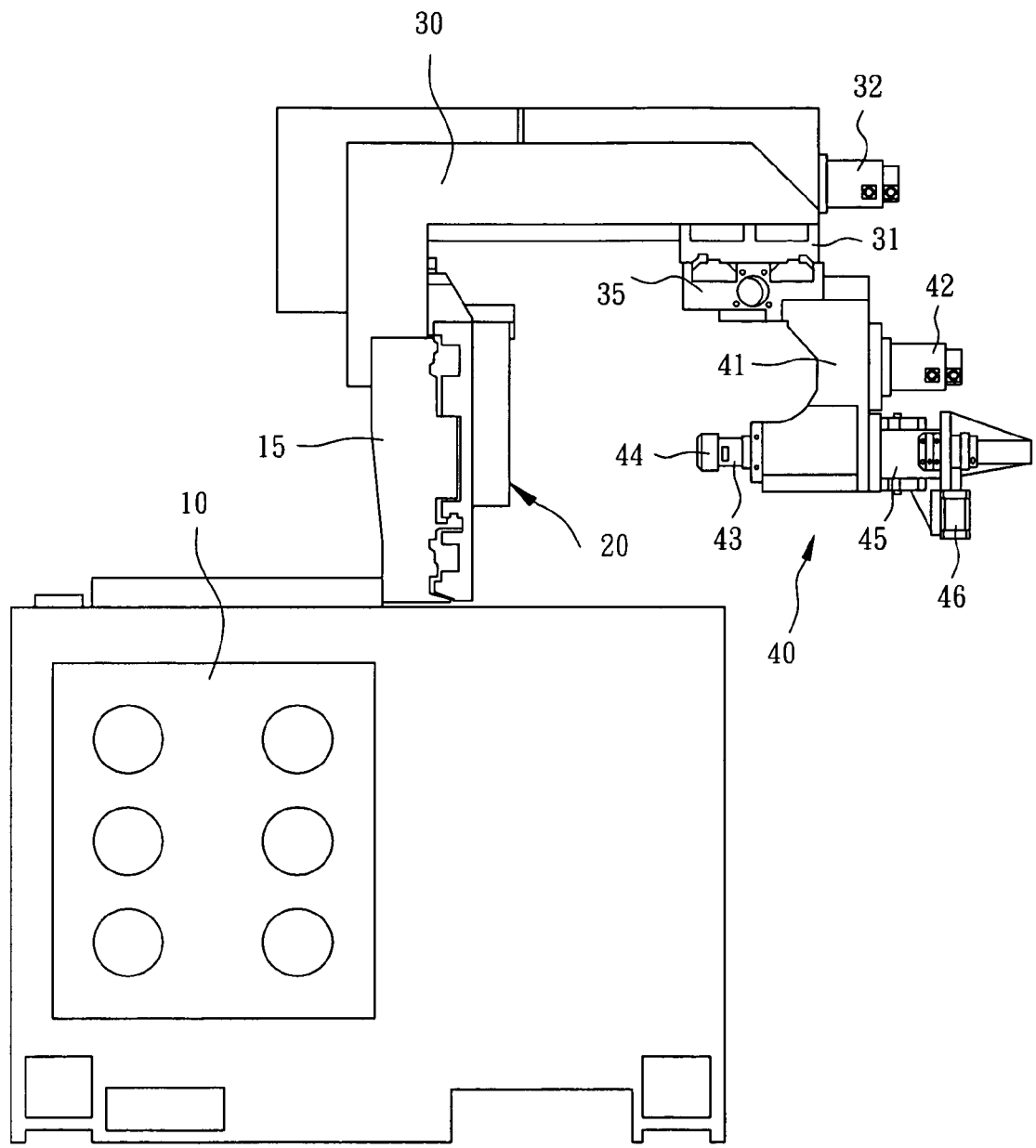
FIG. 4 is a side elevation of the lathe of FIG. 2.

Referring to FIGS. 1 to 4, a lathe in accordance with a preferred embodiment of the invention is shown. The lathe comprises a base 15 mounted on a bed 10 positioned on a floor. A cutting tool 20 is mounted on a front surface of the base 15. An L-shaped arm 30 is affixed to an upper portion of the base 15. A first servo motor 32 is mounted at an open end of the arm 30.

A space 16 is formed adjacent the forward end of the bed 10. A container (not shown) may be mounted in the space 16 for collecting chips as detailed later.

A saddle 31 is mounted on an underside of the horizontal part of the arm 30 adjacent the first servo motor 32. The first servo motor 32 can activate to move the saddle 31 in a machining operation. A slide 35 is mounted on an underside of the saddle 31. A second servo motor 36 is mounted on a front surface of the cutting tool 20 and is adapted to move the slide 35 in a machining operation.

A chuck assembly 40 is mounted on an underside of the slide 35 and comprises a housing 41, a release 45 mounted at a forward end of the housing 41, a main motor 42 mounted at a forward end of the release 45, the main motor 35 having a driving shaft 43 projecting out of a rearward end of the housing 41, a chuck 44 mounted at an end of the driving shaft 43, and a positioning member 46 for positioning the driving shaft 43 when the main motor 42 is in an inoperative state. The release 45 is adapted to actuate to cause the chuck 44 to clamp a workpiece (not shown) or not.

A machining operation of the invention will be described in detail below. The chuck 44 may rotate in high speed and both the saddle 31 and the slide 35 may move to allow the cutting tool 20 to cut the workpiece to a desired shape as operated by an operator. Also, the workpiece clamped by the chuck 44 is always disposed above the space 16 in the machining operation. Thus, formed chips may directly drop into the container in the space 16 without blocking moving paths of the saddle 31, the workpiece, and the cutting tool 20. As a result, the operator will not worry about chip accumulation (i.e., chip jam) in the moving paths.

It is noted that the workpiece is adapted to move along an X-axis (i.e., back and forth) about the cutting tool 20 or along a Y-axis (i.e., transverse), and the cutting tool 20 is adapted to move along the Y-axis (i.e., transverse) or along a Z-axis (i.e., up and down direction) about the workpiece in the machining operation.

While the invention herein disclosed has been described by means of specific embodiments, numerous modifications and variations could be made thereto by those skilled in the art without departing from the scope and spirit of the invention set forth in the claims.

What is claimed is:

1. A lathe comprising:
    a bed having a forward container;
    a base mounted on the bed;
    a cutting tool mounted on a front surface of the base;
    an L-shaped arm affixed to an upper portion of the base;
    a saddle mounted on an underside of the horizontal part of the arm;
    a first motor mounted at an open end of the arm for moving the saddle;
    a container disposed at a forward end of the bed;
    a slide mounted on an underside of the saddle;
    a second motor mounted on a front surface of the cutting tool for moving the slide; and
    a chuck assembly mounted on an underside of the slide and including a housing, a release mounted at a forward end of the housing, a third motor mounted at a forward end of the release, the third motor having a driving shaft projecting out of a rearward end of the housing, a chuck mounted at an end of the driving shaft, and a positioning member for positioning the driving shaft when the third motor is in an inoperative position, wherein a workpiece held by the chuck therein is disposed above the container during a machining operation such that formed chips are adapted to drop into the container without blocking moving paths of the saddle, the workpiece, and the cutting tool.

2. The lathe of claim 1, wherein each of the first and second motors is a servo motor.

3. The lathe of claim 1, wherein the workpiece is adapted to either move back and forth about the cutting tool or move transversely, and the cutting tool is adapted to either move transversely or move along an up and down direction about the workpiece.

* * * * *